(12) United States Patent  (10) Patent No.: US 7,393,184 B2
Cairo  (45) Date of Patent: Jul. 1, 2008

(54) MODULAR BLADES AND METHODS FOR MAKING SAME

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 11/271,097

(22) Filed: Nov. 10, 2005

(65) Prior Publication Data

US 2007/0105431 A1    May 10, 2007

(51) Int. Cl.
*F03D 1/06*   (2006.01)
(52) U.S. Cl. .................. 416/225; 416/230; 416/232
(58) Field of Classification Search ............. 416/223 R, 416/229 R, 232, 225, 230
See application file for complete search history.

(56) References Cited

U.S. PATENT DOCUMENTS

| 4,095,322 | A |   | 6/1978 | Scarpati et al. |
| 4,278,401 | A |   | 7/1981 | Martinelli |
| 4,389,162 | A | * | 6/1983 | Doellinger et al. .......... 416/225 |
| 4,741,943 | A |   | 5/1988 | Hunt |
| 6,056,838 | A |   | 5/2000 | Besse et al. |
| 6,234,423 | B1 |  | 5/2001 | Hirahara et al. |
| 7,186,086 | B2 |  | 3/2007 | Yoshida |

* cited by examiner

*Primary Examiner*—Richard Edgar
(74) *Attorney, Agent, or Firm*—Armstrong Teasdale LLP

(57) ABSTRACT

A method for making a blade includes stacking a plurality of modular segments having formed conduits, threading and tensioning cables through the conduits of the stacked segments, and clamping the cables to hold the modular segments together.

20 Claims, 4 Drawing Sheets

MODULAR BLADES AND METHODS FOR MAKING SAME

BACKGROUND OF THE INVENTION

This invention relates generally to aerodynamic blades and their uses, as well as methods for making such blades. The blades are particularly useful for wind turbine energy generators, but are not limited to such use.

Blade stiffness and structural strength are critical to wind turbine performance. The size of a continuous blade is not conducive to high quality composite material processing and, therefore, structural performance. At least one known contemporary blade is made from fiberglass/epoxy composite material using full blade-length female tooling. The sheer size of the blade makes it difficult to eliminate all trapped air during the lamination process and to achieve uniform processing conditions (and thus, uniform mechanical and physical properties) along the entire blade length. The likelihood of re-work during manufacturing is high because the cost of scrapping is high. Blade quality may suffer as a result, and the cost of manufacturing is high.

BRIEF DESCRIPTION OF THE INVENTION

In one aspect, the present invention thus provides a blade for a turbine or other apparatus. The blade has a plurality of modular segments stacked in the shape of the blade and held together using a plurality of cables.

In another aspect, the present invention provides a wind turbine having a rotor with one or more blades that include a plurality of modular segments stacked in a shape of the blade and held together using a plurality of cables.

In yet another aspect, the present invention provides a method for making a blade. The method includes stacking a plurality of modular segments having formed conduits, threading and tensioning cables through the conduits of the stacked segments, and clamping the cables to hold the modular segments together.

It will be observed that various configurations of the present invention can be used to, among other things, reduce weight at a top of a tower supporting a wind turbine by reducing the weight of blades of the wind turbine while simultaneously improving the structural performance of the blade. Moreover, the initial cost of the blade is reduced while quality is improved and the cost of shipping and handling is reduced.

DETAILED DESCRIPTION OF THE INVENTION

Figure 1:
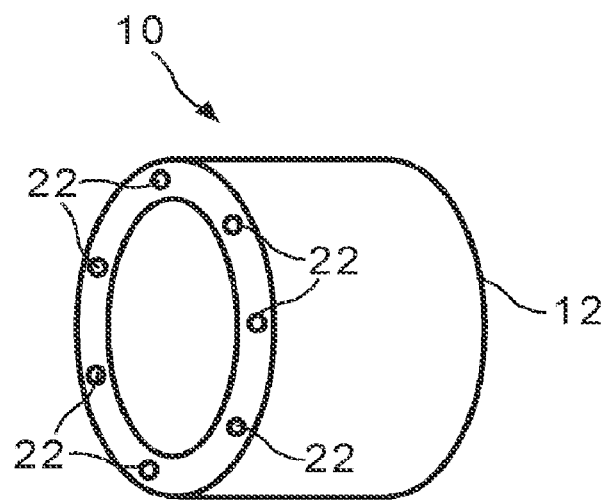
FIG. 1 is a drawing of a configuration of a modular blade segment that includes a monolithic composite material shell.
Figure 2:
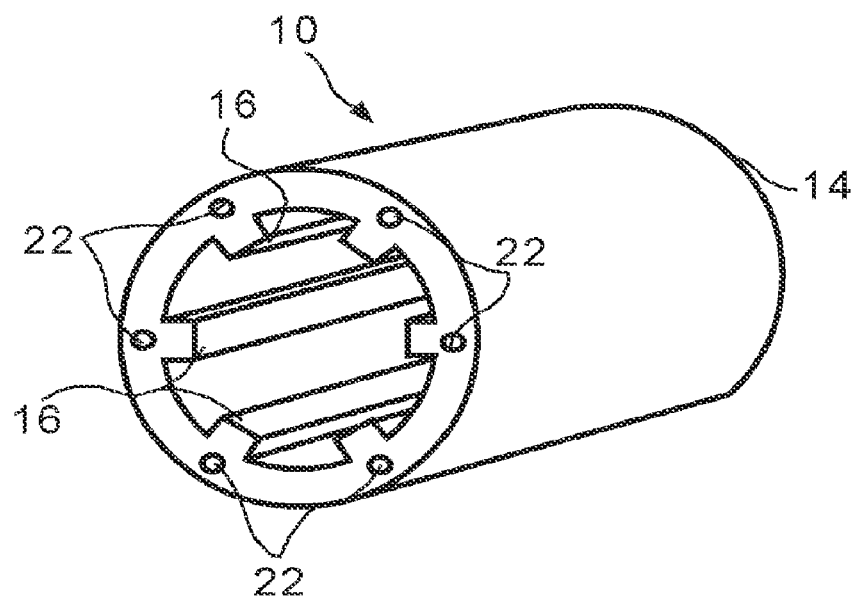
FIG. 2 is a drawing of a configuration of a modular blade segment that includes stiffeners that utilize a combination of unidirectional carbon/epoxy caps to carry blade bending loads in axial tension or compression and balsa wood webs to carry transverse shear due to blade bending.
Figure 3:
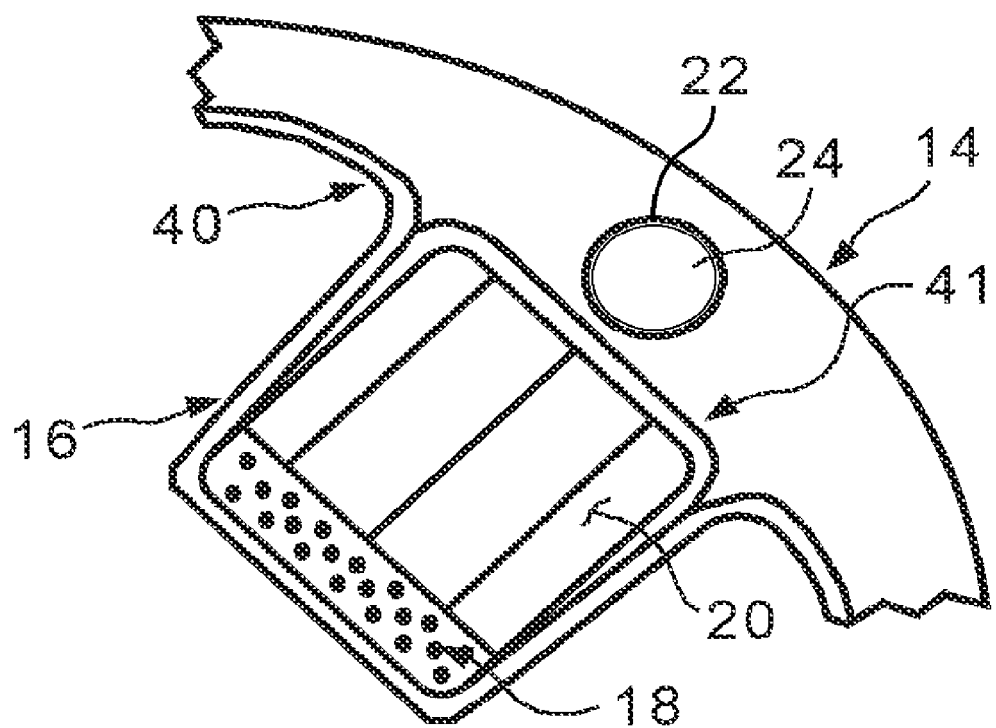
FIG. 3 is a drawing of a cross-section of one stiffener of the modular blade segment of FIG. 2.

Referring to FIG. 1, some configurations of the present invention feature modular blade segments 10 that include a monolithic composite material shell 12. In some other configurations and referring to FIG. 2, an integrally stiffened composite material shell 14 is used that comprises stiffeners 16 that utilize a combination of unidirectional carbon/epoxy caps 18 to carry blade bending loads in axial tension or compression and balsa-wood webs 20 to carry transverse shear due to blade bending. Referring to FIG. 3, stiffeners 16 in some configurations of the present invention comprise a closure layer 40 of composite material and an encapsulating layer 41 of composite material. Layer 41 encapsulates balsa wood webs 20.

Referring to both FIGS. 1, 2, 3, and 4, some configurations of the present invention have formed-in-place conduits 22 for cables, which can be braided steel post-tensioned cables 24. Also, in some configurations, braided steel cables 24 are post-tensioned after modular segments 10 are assembled at a job site.

Figure 4:
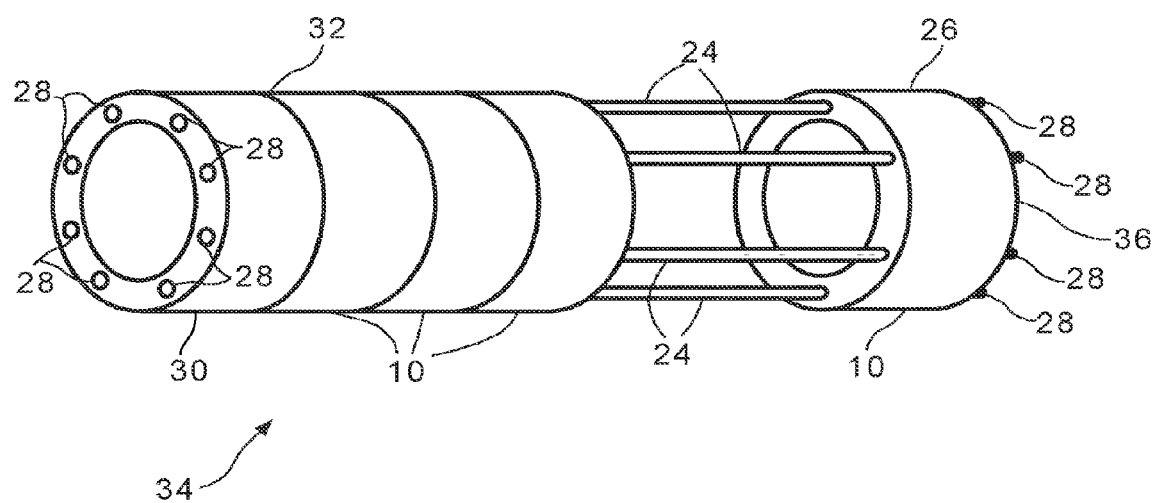
FIG. 4 is a drawing of a configuration of a blade with some segments omitted to show cables that connect the sections of the blade together.

Referring to FIG. 4, additional features incorporated into some configurations of the present invention include one or more of a blade tip cap 26 for reacting cable 24 tension loading, cable retention clamps 28 to restrain cables 24 at tip attachment 26 and hub attachment 30, and/or a hub attachment 30 that is bonded and/or bolted single overlap or bonded and/or bolted multi-step joint on blade root end 32. In various configurations, the length of modular sections 10 is set in accordance with at least one of blade twist or chord width variation to avoid points of abrupt change in geometry.

Thus, referring to FIGS. 1, 2, 3, and 4, some configurations of the present invention provide a blade or blades 34 for a turbine (such as a wind turbine) or another apparatus. Blade or blades 34 comprise a plurality of modular segments 12 or 14 stacked in the shape of blade 34 and held together using a plurality of cables 24 passing through formed conduits 22. In some configurations, modular segments 10 comprise a composite material 12, while in some others, modular segments 10 comprise a monolithic composite material shell 14.

Some configurations utilize modular segments 10 that comprise an integrally stiffened composite material shell 14 with stiffeners 16 utilizing unidirectional caps 18 comprising carbon material or epoxy material, or both types of material.

Modular segments 10 can comprise an integrally stiffened composite material shell 14 configured to carry blade bending loads in axial tension or compression and balsa wood webs 20 configured to carry transverse shear resulting from blade 34 bending.

In some configurations, cables 24 comprise tensioned braided steel cables. Also, a blade tip cap 26 is used in some configurations for reacting cable tension loading. Cable retention clamps 28 are provided in some configurations. Clamps 28 are configured to retain cables 24 at a tip 36 of blade 34 and at a hub attachment 30. Blade 34 has a blade root end 32 and, in some configurations, a hub attachment 30 bonded, bolted, or both in a single overlap; or bonded, bolted, or both at a multstep joint at blade root end 32. In some configurations, the length of modular sections 10 is predetermined in accordance with blade twist and chord width variation to avoid points of abrupt change in geometry.

Figure 5:
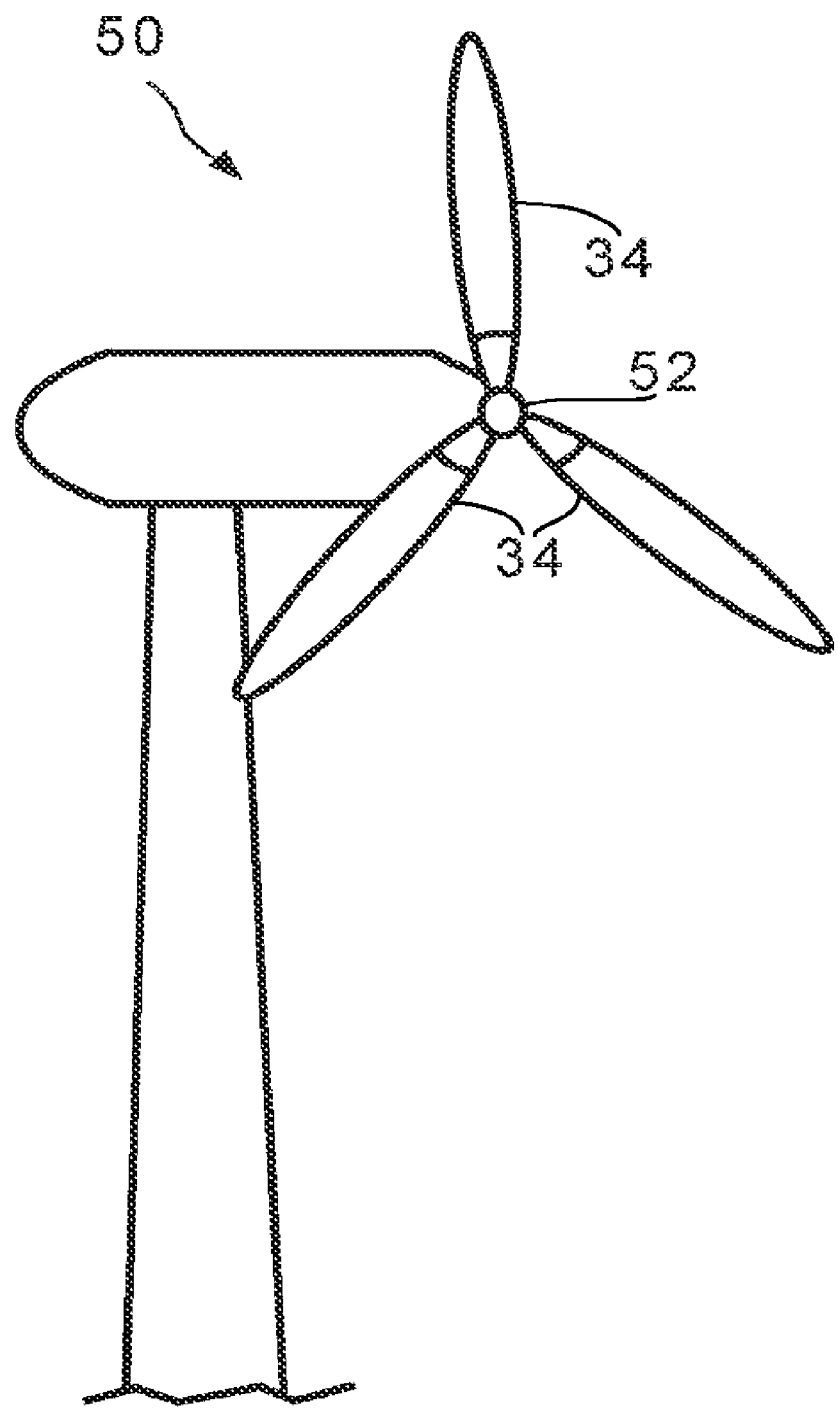
FIG. 5 is a drawing of a wind turbine configuration of the present invention.

Referring to FIG. 5, blades 34 are suitable for use with many types of turbines and engines, and are particularly suitable for use in wind turbines. For example, a wind turbine 50 configuration can include a rotor 52 with one or more blades 34 of a configuration such as those described above.

In some configurations of the present invention and referring to FIGS. 1, 2, 3, and 4, a blade 34 is made using a method that includes stacking a plurality of modular segments 10 having formed conduits 22, threading and tensioning cables 24 through conduits 22, and clamping cables 24 to hold modular segments 10 together. Some configurations further include attaching an end cap 26 accommodating either end joints 28 for cables 24 or direct bolting of cables 24. Also, some configurations further attach a blade tip cap 26 to stacked segments 10 and threaded cables 24. Segments 10 can each be monolithic 12 or can comprise a composite material shell with caps 14. Also, some configurations preselect a length of modular segments 10 in accordance with blade twist and chord width variation to avoid points of abrupt change in blade geometry.

It will thus be appreciated that various configurations of the present invention reduce weight at a top of a tower supporting a wind turbine by reducing the weight of blades of the wind turbine while simultaneously improving the structural performance of the blade. In some configurations, this improvement is brought about, in part, via increased material processing consistency. Moreover, the initial cost of the blade is reduced while quality is improved and the cost of shipping and handling is reduced.

While the invention has been described in terms of various specific embodiments, those skilled in the art will recognize that the invention can be practiced with modification within the spirit and scope of the claims.

What is claimed is:

1. A blade for a turbine or other apparatus, said blade comprising a plurality of modular segments stacked in the shape of the blade and held together using a plurality of cables, said plurality of modular segments comprise:
   a plurality of conduits spaced circumferentially about said plurality of modular segments and extending axially through said plurality of segments, each said plurality of conduits configured to receive one of said plurality of cables therein;
   a plurality of stiffeners extending axially along said plurality of segments and positioned inward from said plurality of conduits, each of said plurality of stiffeners substantial radially-aligned with a respective conduit and configured to carry axial and sheer forces exerted upon the blade; and
   a stiffened shell configured to increase a stiffness and structural strength of said plurality of modular segments.

2. A blade in accordance with claim 1 wherein said stiffened shell comprises a monolithic composite material shell.

3. A blade in accordance with claim 1 wherein said plurality of stiffeners further comprise:
   a plurality of unidirectional caps comprising at least one of a carbon material and an epoxy material, said caps configured to carry blade bending loads in axial tension or compression; and
   a plurality of webs positioned within said caps, said plurality of webs configured to carry transverse shear due to blade bending.

4. A blade in accordance with claim 3 wherein said plurality of webs further comprise a plurality of webs fabricated from balsa wood.

5. A blade in accordance with claim 3 wherein said plurality of modular segments further comprise:
   an encapsulating layer of composite material configured to encapsulate said plurality of webs; and
   a closure layer of composite material configured to couple said plurality of webs to said plurality of modular segments.

6. A blade in accordance with claim 1 wherein said cables comprise tensioned braided steel cables.

7. A blade in accordance with claim 1 further comprising a blade tip cap configured for reacting cable tension loading.

8. A blade in accordance with claim 1 further comprising cable retention clamps configured to retain cables at a tip of the blade and at a hub attachment.

9. A blade in accordance with claim 1 having a blade root end and further comprising a hub attachment bonded, bolted, or both in a single overlap or bonded, bolted, or both at a multistep joint at the blade root end.

10. A blade in accordance with claim 1 wherein a length of said modular sections is predetermined in accordance with blade twist and chord width variation to avoid points of abrupt change in geometry.

11. A wind turbine having a rotor with one or more blades comprising a plurality of modular segments stacked in a shape of the blade and held together using a plurality of cables, said plurality of modular segments comprise:
   a plurality of conduits spaced circumferentially about said plurality of modular segments and extending axially through said plurality of segments, each said plurality of conduits configured to receive one of said plurality of cables therein;
   a plurality of stiffeners extending axially along said plurality of segments and positioned inward from said plurality of conduits, each of plurality of stiffeners substantially radially-aligned with a respective conduit and configured to carry axial and sheer forces exerted upon the blade; and
   a shell configured to increase a stiffness and structural strength of said plurality of modular segments.

12. A wind turbine in accordance with claim 11 wherein said modular segments comprise a composite material.

13. A wind turbine in accordance with claim 11 wherein said stiffened shell comprises a monolithic composite material shell.

14. A wind turbine in accordance with claim 11 wherein said modular segments comprise an integrally stiffened composite material shell with stiffeners utilizing unidirectional caps comprising at least one of a carbon material and an epoxy material.

15. A method for making a blade comprising:
   fabricating a plurality of modular segments, wherein each of the modular segments includes:
      a plurality of conduits spaced circumferentially about said plurality of modular segments and extending axially through said plurality of segments, each said plurality of conduits configured to receive one of said plurality of cables;
      a plurality of stiffeners extending axially along said plurality of segments and positioned inward from said plurality of conduits, each of plurality of stiffeners substantially radially-aligned with a respective conduit and configured to carry axial and sheer forces exerted upon the blade; and
      a stiffened shell configured to provide stiffness and structural strength to the plurality of modular segments;
   stacking the plurality of modular segments having formed conduits;
   threading and tensioning cables through the conduits of the stacked segments; and
   clamping the cables to hold the plurality of modular segments together.

16. A method in accordance with claim 15 further comprising attaching an end cap accommodating either end joints for said cables or direct bolting of the cables.

17. A method in accordance with claim 15 further comprising attaching a blade tip cap to the stacked segments and threaded cables.

18. A method in accordance with claim 15 wherein the segments are each monolithic.

19. A method in accordance with claim 15 wherein the segments comprise a composite material shell with caps.

20. A method in accordance with claim 15 further comprising selecting a length of the modular segments in accordance with blade twist and chord width variation to facilitate avoiding points of abrupt change in blade geometry.

* * * * *